(12) United States Patent
Thompson

(10) Patent No.: US 6,454,102 B2
(45) Date of Patent: *Sep. 24, 2002

(54) BELT PRESS WITH ADJUSTABLE INLET GUIDE

(75) Inventor: James E. Thompson, The Woodlands, TX (US)

(73) Assignee: Ashbrook Corporation, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/819,833

(22) Filed: Mar. 28, 2001

Related U.S. Application Data

(60) Division of application No. 09/608,922, filed on Jul. 3, 2000, now Pat. No. 6,248,245, which is a continuation-in-part of application No. 09/087,529, filed on May 29, 1998, now abandoned.

(51) Int. Cl.⁷ .......................... B01D 33/04; B01D 33/72
(52) U.S. Cl. ...................... 210/386; 210/396; 210/400; 210/783; 100/118; 100/153; 198/626.3; 198/626.5
(58) Field of Search ............................ 210/783, 386, 210/396, 400; 100/118, 153; 198/626.3, 626.5

(56) References Cited

U.S. PATENT DOCUMENTS

| 3,796,148 A | 3/1974 | Heissenberger | 100/118 |
|---|---|---|---|
| 3,796,149 A | 3/1974 | Heissenberger | 100/118 |
| 3,894,486 A | 7/1975 | Sparowitz et al. | 100/118 |
| 3,906,853 A | 9/1975 | Wohlfarter | 100/118 |
| 3,942,433 A | 3/1976 | Wohlfarter | 100/118 |
| 3,945,789 A | 3/1976 | Boman | 425/371 |
| 3,998,149 A | 12/1976 | Malarkey, Jr. | 100/118 |
| 4,147,101 A | 4/1979 | Heissenber et al. | 100/118 |
| 4,584,936 A | 4/1986 | Crandall et al. | 100/118 |
| 4,879,034 A | 11/1989 | Bastgen | 210/400 |
| 5,240,609 A | 8/1993 | Langley | 210/386 |
| 5,545,333 A | 8/1996 | Louden et al. | 210/739 |
| 5,592,874 A | 1/1997 | Blauhut | 100/93 RP |
| 6,248,245 B1 * | 6/2001 | Thompson | 210/783 |

OTHER PUBLICATIONS

Flottweg Veronesi Separation Technology brochure "Solid–Liquid Separation and System Engineering", Oct. 10, 1994, 4 pages.

* cited by examiner

*Primary Examiner*—Robert J. Popovics
(74) *Attorney, Agent, or Firm*—Webb Ziesenheim Logsdon Orkin & Hanson, P.C.

(57) ABSTRACT

A belt press having a frame with a first belt and a second belt rotatably mounted on the frame. A curved inlet guide is movably carried on the frame. The inlet guide has a decreasing radius of curvature from an inlet end to an exit end. A positioning assembly is mounted on the frame and is attached to the inlet end of the inlet guide to raise and lower the inlet end of the inlet guide.

8 Claims, 4 Drawing Sheets

BELT PRESS WITH ADJUSTABLE INLET GUIDE

CROSS-REFERENCE TO RELATED APPLICATION

This application is a divisional of U.S. application Ser. No. 09/608,922, filed Jul. 3, 2000, now U.S. Pat. No. 6,248,245, which is a continuation-in-part of U.S. application Ser. No. 09/087,529, filed May 29, 1998, now abandoned, both of which applications are herein incorporated by reference in their entirety.

This application is a continuation-in-part of U.S. application Ser. No. 09/087,529, filed May 29, 1998, herein incorporated by reference.

BACKGROUND OF THE INVENTION

1. Field of the Invention

The invention relates generally to the field of solid/liquid separation systems and, more particularly, to a belt press having an elliptically shaped inlet guide or grid which allows the pressure on a solid/liquid mixture in the belt press to be controlled.

2. Technical Considerations

Various systems are known in the art for dewatering solid/liquid mixtures, suspensions or slurries, such as sewage sludge or other flocculated or unflocculated slurries. Such mixtures, suspensions or slurries will be referred to hereinafter simply as "mixtures". In cases where the solids are formed primarily of compressible, granular, fibrous or cellular components, belt presses are typically used to separate the solid components from the liquid components. Belt presses dewater the solid/liquid mixture by applying an increasing surface pressure to the mixture as the mixture is carried between two moving belts and through a series of press rollers.

One example of a prior art belt press is schematically shown and generally designated 10 in FIG. 1 of the drawings. The belt press 10 has a frame 12 with an upper belt 14 and a lower belt 16. The belts 14 and 16 are typically liquid permeable. The upper belt 14 is rotatably mounted around a plurality of guide rollers 18. The lower belt 16 is independently, rotatably mounted around a plurality of guide rollers 18'. The upper and lower belts 14 and 16 are looped around a series of press rollers 20.

To dewater a solid/liquid mixture, the mixture is continuously fed into a feed box 22 located above the upper surface of the lower belt 16. The feed box 22 distributes the mixture uniformly over the top of the lower belt 16. The belts 14 and 16 are rotated in conventional manner, such as by electric motors turning the guide rollers 18, 18'. As the lower belt 16 moves toward the left, as shown in FIG. 1, the bottom of the lower belt 16 rides across a stationary inlet grid 24 fixedly mounted on the frame 12. The inlet grid 24 has a flat or planar entrance portion 25 near the feed box 22 and a short, curved exit portion 26 at the other end. The exit portion 26 has a constant radius.

As the belts 14 and 16 rotate to the left, as shown in FIG. 1, the mixture enters a "wedge zone" 27 between the upper and lower belts 14 and 16 where pressure is applied to the mixture by the belts. As the mixture is pressed in the wedge zone 27 between the two belts 14 and 16, liquid is pressed out of the mixture to start forming a sludge or filter cake between the upper and lower belts 14 and 16. A pressing mechanism 28, such as a plate or a series of rollers, is generally located above the lower portion of the upper belt 14 to press the upper belt 14 toward the lower belt 16 to increase the pressure on the mixture between the belts 14 and 16. The exit portion 26 of the inlet grid curves downwardly to guide the upper and lower belts 14 and 16, along with the filter cake trapped therebetween, around a perforated roller 29 where more liquid is pressed out of the filter cake. The belts 14 and 16, along with the filter cake therebetween, move through the series of press rollers 20. The press rollers 20 are arranged in decreasing diameters in a direction of movement of the belts 14 and 16. The press rollers 20 provide an increasing compressive and shearing force on the filter cake to further dewater the filter cake. At the end of the series of press rollers 20, the belts 14 and 16 separate and the dewatered filter cake is released and collected.

While generally adequate for dewatering sludge, such conventional belt presses 10 have several shortcomings. One problem with the known belt presses 10 is that if the pressure on the solid/liquid mixture between the belts 14 and 16 is increased too quickly, some of the mixture may be ejected sideways from between the belts 14 and 16. Further, since the exit portion 26 is of constant curvature, it provides an increased pressure of about the same magnitude over its entire area. It is, therefore, difficult to gradually increase the pressure on the mixture as it moves through the wedge zone 27. Additionally, the mechanical pressing mechanism 28 must be serviced and maintained to keep it in proper working order. Another problem with such known belt presses is that it is difficult to change the pressure profile on the filter cake to compensate for various viscosities or thicknesses of different materials to be filtered. While some belt presses provide for some adjustment in the wedge zone, this is generally accomplished by changing the convergence angle of the two belts. However, this adjustment typically also changes the pressure rise profile. That is, increasing the angle between the belts causes a more rapid pressure rise which must be accounted for by reducing the belt tension and, hence, the overall performance of the press.

Another known dewatering device is disclosed in U.S. Pat. No. 4,879,034 to Bastgen. This device consists of a frame carrying a supporting plate which is flexible so that the curvature of the supporting plate can be changed. The supporting plate can be formed of a number of separate plate parts which are joined together to form the flexible supporting plate. A series of movable members are attached along the supporting plate so that as the movable members are individually pivoted on the frame, the curvature profile of the supporting plate changes. However, this complex, multi-component plate construction adds to the cost of making, using, and maintaining the device.

Therefore, it is an object of the invention to provide a belt press of reduced complexity but which reduces the problems associated with known belt presses. It is additionally an object of the invention to provide a belt press having a pivotable inlet guide or grid to control the pressure on a solid/liquid mixture between the belts of the press. It is further an object of the invention to provide a belt press having an inlet guide in which the angle between the belts may be adjusted by moving an entrance end of the guide to control a tangent point of the upper belt on the lower belt without changing the curvature profile of the inlet guide. It is also an object of the device to provide a belt press which does not require a conventional mechanical pressing mechanism.

SUMMARY OF THE INVENTION

A belt press is provided having a frame with a first belt and a second belt rotatably mounted on the frame. A curved inlet guide is movably carried on the frame, the inlet guide having a decreasing radius from an inlet end to an exit end. The inlet guide has a fixed, i.e., non-changeable, curvature profile. A positioning assembly is mounted on the frame and attached to the inlet guide, preferably substantially adjacent the inlet end of the inlet guide, to move the inlet end of the inlet guide up and down with respect to the frame, e.g., by pivoting the exit end of the inlet guide on the frame.

A complete understanding of the invention will be obtained from the following description when taken in connection with the accompanying drawing figures wherein like reference characters identify like parts throughout.

DESCRIPTION OF THE PREFERRED EMBODIMENTS

Figure 1:
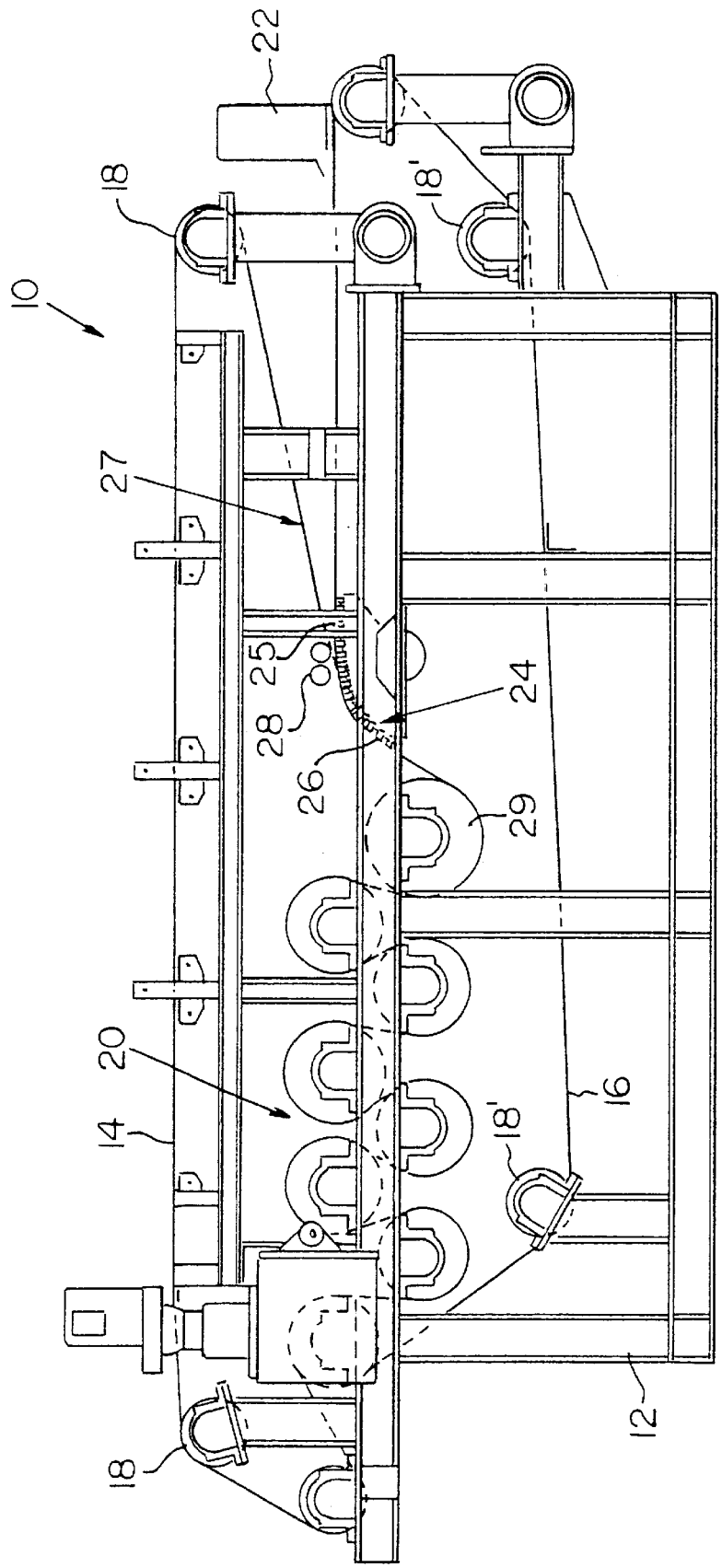
FIG. 1 is a side view of a conventional belt press.

For purposes of the description hereinafter, the terms "upper", "lower", "right", "left", "vertical", "horizontal", "top", "bottom" and derivatives and equivalents thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

Figure 2:
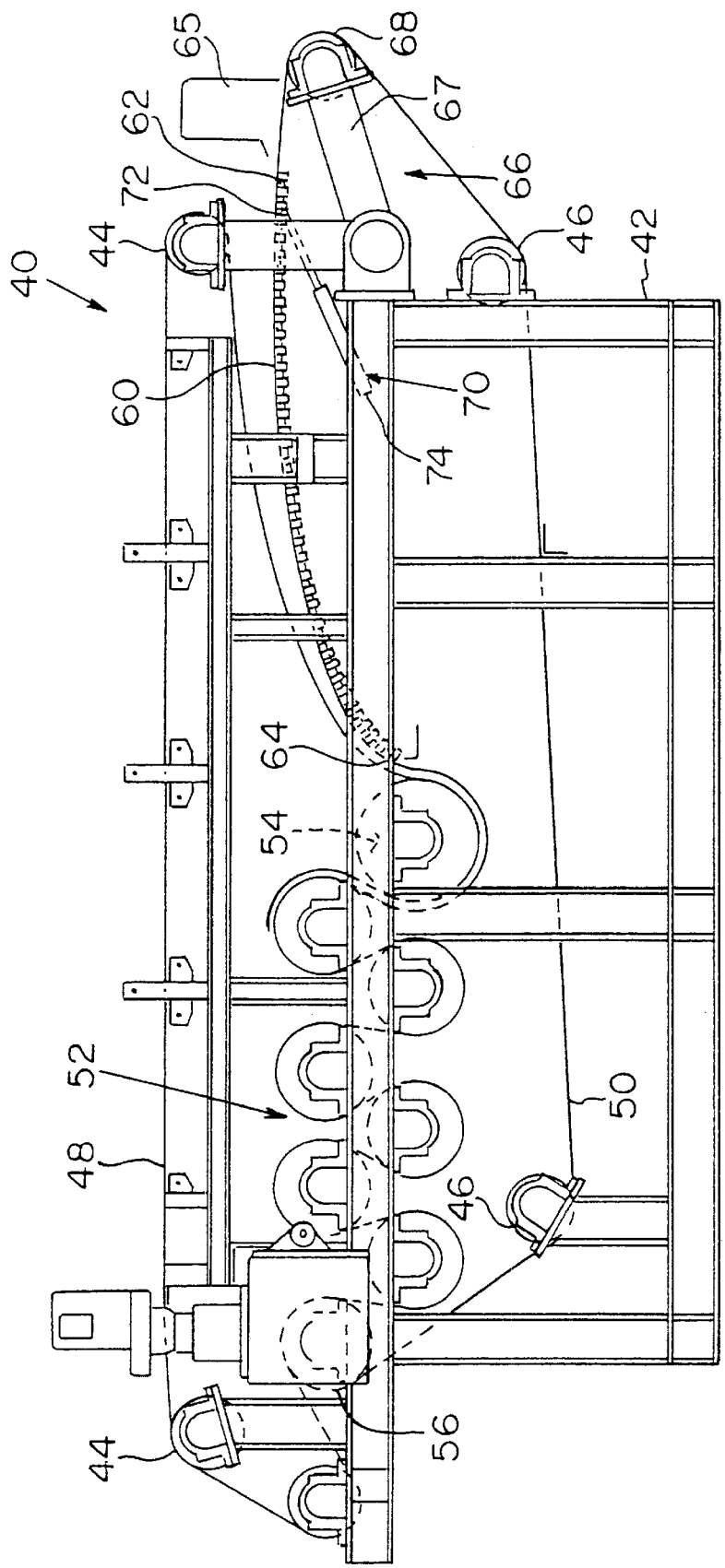
FIG. 2 is a side view of a first embodiment of a belt press of the invention with the inlet grid in a lower position.
Figure 3:
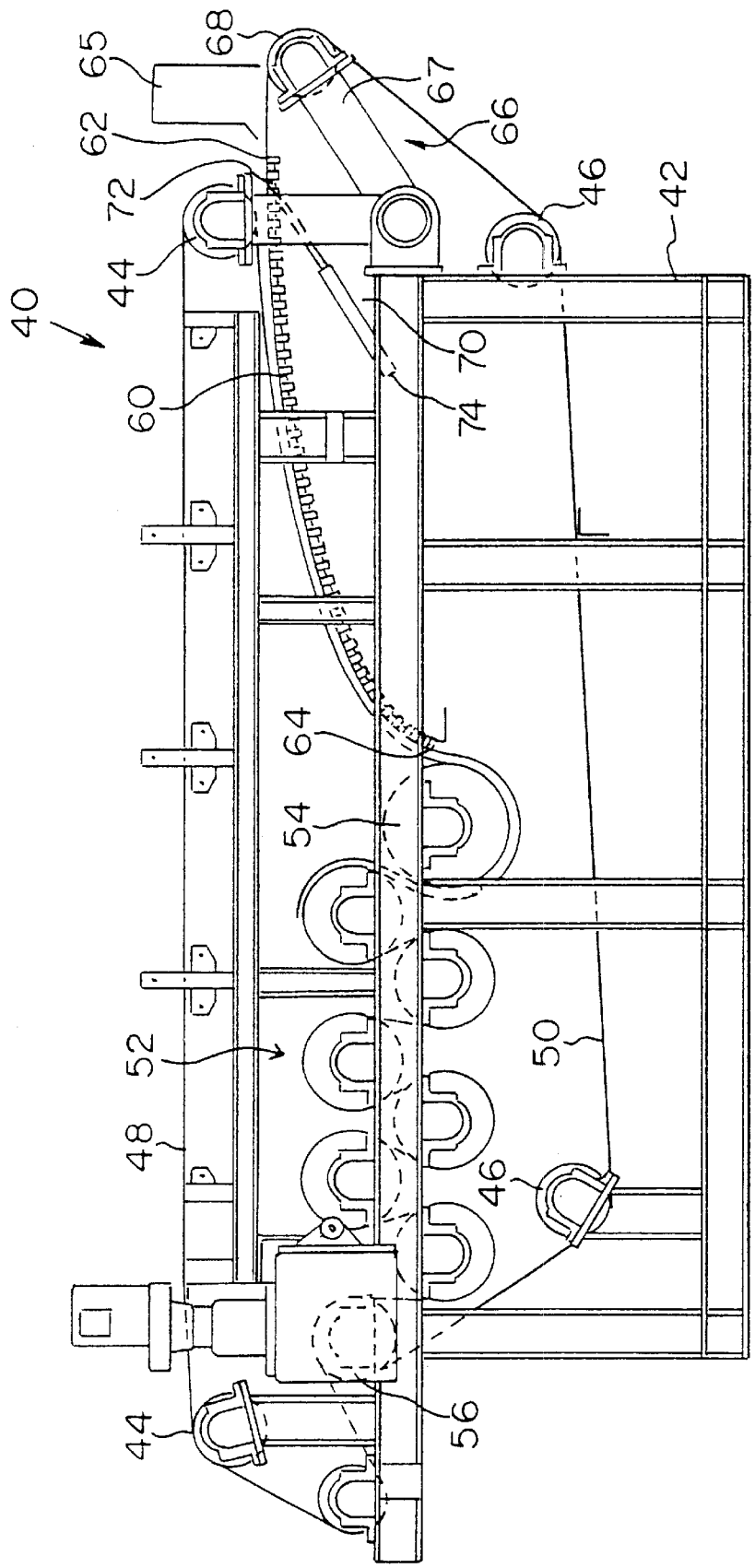
FIG. 3 is a side view of the belt press of FIG. 2 with the inlet grid in an upper position.

A first embodiment of a belt press of the present invention is generally designated 40 in FIGS. 2 and 3 of the drawings. The belt press 40 has a metal frame 42 rotatably supporting a first set of guide rollers 44 and a second set of guide rollers 46. A first or upper belt 48 is rotatably mounted on the first guide rollers 44 and a second or lower belt 50 is rotatably mounted on the second guide rollers 46. The belts 48 and 50 are preferably liquid permeable and extensible, such as canvas. A set of press rollers 52 are rotatably mounted on the frame 42 and include an inlet roller 54 and an outlet roller 56. The belts 48 and 50 pass between and around the press rollers 52.

An inlet grid or guide 60 is mounted on the frame 12 and is preferably formed by a series of substantially parallel, spaced-apart plastic wiper bars turned on edge and arranged in a holder to form a rigid grid having a fixed curvature profile. By "fixed curvature profile" is meant that the curvature profile of the inlet guide 60 is not substantially changeable or adjustable along the length of the inlet guide 60. The inlet guide 60 is preferably not composed of separately movable parts but rather presents a rigid, not purposely flexible profile. The inlet guide 60 has a first or inlet end 62 and a second or exit end 64. The inlet guide 60 is preferably elliptically shaped, i.e., continuously curved with a decreasing radius from the first end 62 to the second end 64. Preferably, the inlet guide 60 has a length of about 5–8 feet, with a radius near the first end 62 of about 6 feet and a radius near the second end 64 of about 1 foot. The radius profile of the inlet guide 60 is not variable or adjustable. The second end 64 of the inlet guide 60 is pivotally mounted on the frame 42 adjacent the inlet roller 54 in conventional manner, such as by a hinge or pivot pin. Alternatively, the inlet guide 60 can be of a rigid, unitary construction.

A feed device, such as a feed box 65, is located above the upper surface of the lower belt 50 near the first end 62 of the inlet guide 60.

A belt tensioning device 66, such as a pivotably mounted arm 67 having an inlet guide roller 68, is preferably located adjacent the first end 62 of the inlet guide 60. A positioning assembly 70 is carried on the frame 42. The positioning assembly 70 has a first end 72 rotatably or pivotally attached to the inlet guide 60, preferably adjacent the first end 62 of the inlet guide 60, and a second end 74 rotatably or pivotably attached to the frame 42. The positioning assembly 70 preferably includes an extensible and retractable member and can be of any conventional type, such as a piston and cylinder ssembly with the end of the piston attached to the inlet guide 60; a jack screw; a chain nd sprocket device; a lever; a lever and cam assembly; or an electric actuator. The ositioning device 70 is configured to adjust the position, for example, raise and lower, the first end 62 of the inlet guide 60 while the second end 64 of the inlet guide 60 pivots on the frame 42.

Figure 4:
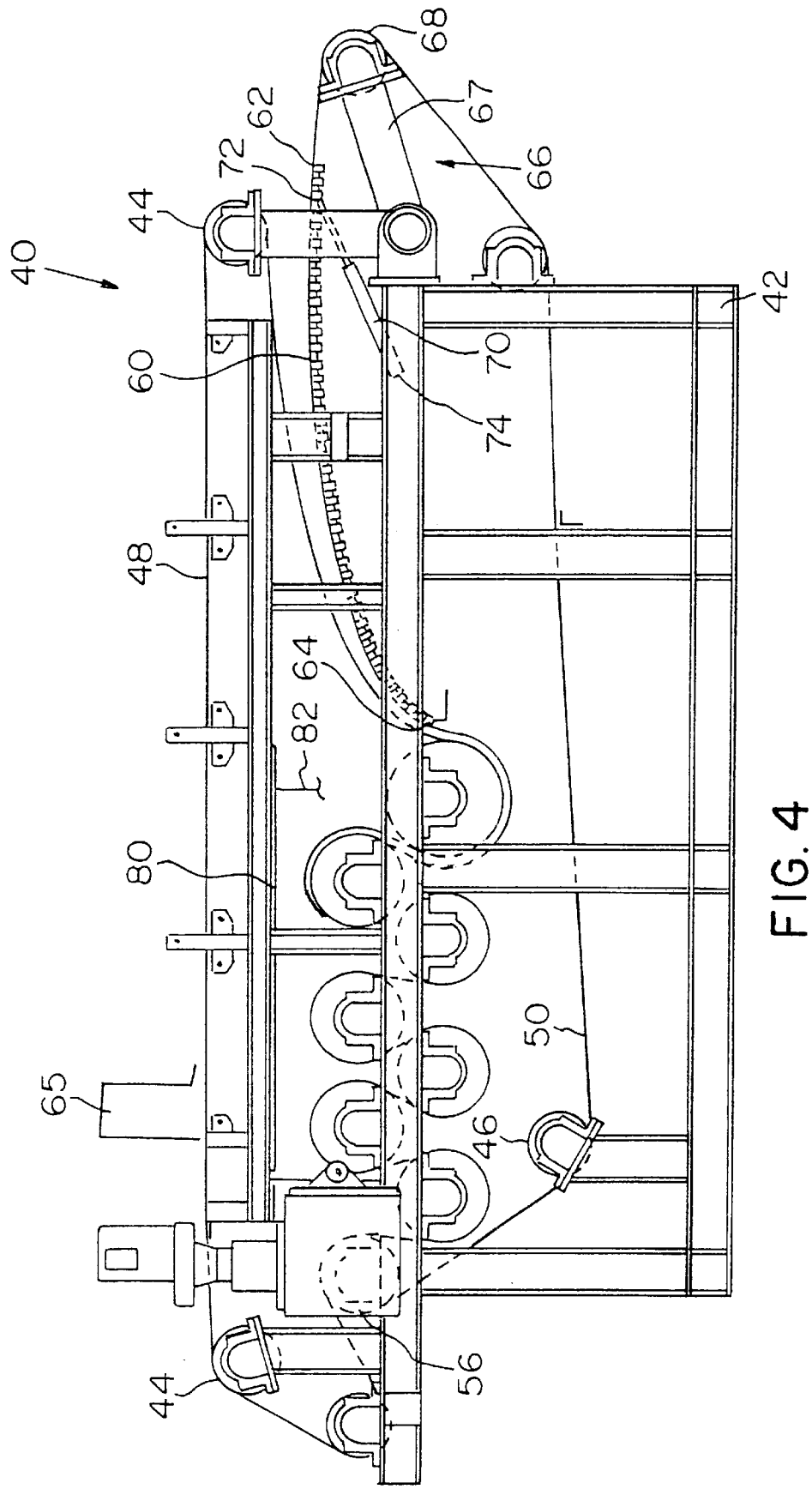
FIG. 4 is a side view of a second embodiment of the belt press of the invention.

A second embodiment of the belt press 40 is shown in FIG. 4 of the drawings. The second embodiment is similar to the first embodiment previously discussed but the feed box 65 is positioned above the upper surface of the upper belt 48 above the press rollers 52. In order to prevent liquid from dripping onto the region of the belts 48 and 50 passing through the press rollers 52, a collection pan 80 having a drain line 82 is positioned between the upper surface or portion of the upper belt 48 and the press rollers 52.

Operation of the belt press 40 will now be described. Looking first at the embodiment shown in FIGS. 2 and 3 of the drawings, a solid/liquid mixture, for example a slurry, passes through the feed box 65 and onto the top of the lower belt 50 near the first end 62 of the inlet guide 60. This is the preferred location of the feed box 65 when treating heavy or viscous sludges or slunies. The upper belt 48 rotates clockwise around the first guide rollers 44 and the lower belt 50 rotates counterclockwise around the second guide rollers 46. This rotation can be accomplished in conventional manner, such as by electric motors driving one or more of the first and second guide rollers 44 or 46. Thus, as the belts 48 and 50 move, the mixture is carried across the top of the inlet guide 60 and into the wedge zone between the two belts 48 and 50 where liquid is pressed out of the mixture to form a more viscous sludge.

As the wet sludge moves between the two belts 48 and 50 and along the curved belt path over the inlet guide 60, the pressure on the sludge is gradually increased to press out the liquid. At this point in the process, the sludge is typically of a very loose consistency and cannot be pressed too forcefully or it will be ejected sideways from between the belts 48 and 50. The elliptically curved inlet guide 60 allows the liquid to be gently removed while gradually and continuously increasing the pressure on the forming sludge cake.

The pressure on the material between the belts 48 and 50 is inversely proportional to the radius of the inlet guide 60 over which the belts 48 and 50 ride. The smaller the radius, the higher the pressure. The inlet guide 60 gradually changes from a large radius near the inlet end 62 to a small radius at the exit end 64. Therefore, the dewatering process starts with substantially no pressure on the mixture between the belts 48 and 50 at the inlet end 62 of the inlet guide 60 and moves through a gradually increasing pressure profile to a controlled higher pressure at the exit end 64 of the inlet guide 60.

The belts 48 and 50 then move through the set of press rollers 52 ejecting additional liquid until, at the exit end of the belt press 40, the dewatered filter cake is ejected. The tension on the belts 48 and 50 can be increased or decreased in conventional manner, such as by the belt tensioning device 66 which can be pivoted to control the tension of the associated belt 50.

The inlet angle between the belts 48 and 50 can be controlled by moving, for example raising and lowering, the first end 62 of the inlet guide 60 to open the inlet angle for large flows or narrow the inlet angle for small flows. Moving the first end 62 of the inlet guide 60 up or down changes the tangent point of the upper belt 48 on the lower belt 50 on the curved inlet guide 60, which changes the pressure on the sludge between the belts 48 and 50 while maintaining substantially the same pressure rise profile. The inlet guide 60 can be moved by the positioning assembly 70 between a first or upper position, shown in FIG. 3 of the drawings, and a second or lower position, shown in FIG. 2 of the drawings. As the first end 62 of the inlet guide 60 is moved, the second end 64 of the inlet guide 60 pivots on the frame 42 to maintain the second end 64 adjacent the inlet roller 54. Thus, the inlet guide 60 pivots around a single pivot point (at the second end 64) when the first end 62 is raised or lowered. Further, throughout this pivoting operation, the curvature profile of the inlet guide 60 does not change. Additionally, the pressure on the sludge between the belts is influenced by the belt tension. By moving the first end 62 of the inlet guide 60 to deflect the belts 48 and 50 further from a straight path, the belt tension, and, therefore, the pressure on the sludge, can be changed. The belt tensioning device 66 may also be moved with the inlet guide 60, as shown in FIGS. 2 and 3 of the drawings, to adjust the belt tension. As the position of the first end 62 of the inlet guide 60 is raised or lowered, the position of the feed device would also preferably be similarly raised or lowered in conventional manner, such as by a conventional hydraulic or lever assembly.

The fixed elliptical curvature profile of the inlet guide 60 permits the pressure in the wedge zone to move through an optimal progression which can be mathematically determined on the basis of the mixture being dewatered. The pressure at any point in the wedge zone along the inlet guide 60 is calculated by dividing the total belt tension by the radius of the inlet guide 60 at that point. Since the pressure can thus be optimized, more liquid can be removed along the length of the inlet guide 60 than is possible with prior art devices. This means that the pressure at the second end 64 of the inlet guide 60 may also be higher than in previous devices and allows the cake between the belts 48 and 50 to be pressed much harder as it approaches the exit of the inlet guide 60.

Operation of the second embodiment of the belt press 40 shown in FIG. 4 of the drawings is similar to that of the first embodiment shown in FIGS. 2 and 3 of the drawings except that the mixture is introduced onto the upper belt 48. As the mixture moves along the upper surface of the upper belt 48, liquid from the mixture may fall through the upper belt 48. This liquid is collected in the collection pan 80 and removed by a drain line 82. The collection pan 80 prevents this liquid from falling onto the press rollers 52.

The mixture to be separated flows from the feed box 65 onto the upper surface of the upper belt 48. The mixture is moved rightward along the upper surface of the upper belt 48 with respect to FIG. 4 and drops from the rightmost end of the upper belt 48 onto the top of the lower belt 50 on the inlet guide 60, from where it is moved into the wedge zone and is dewatered in the same manner as described above.

Thus, the present invention provides a belt press having an economical and unique way of varying the pressure on the mixture between the belts to vary the pressure in accordance with the mixture characteristics, such as density and flow rate. Additionally, the present invention provides a movable or adjustable inlet guide to control the pressure on the mixture between the two belts and to help prevent sideways ejection of material from between the belts. The pivotable, rigid, elliptical grid design of the invention eliminates the need for any additional mechanical pressing mechanisms to press the upper belt 48 onto the lower belt 50 in the wedge zone. Eliminating the mechanical pressing mechanisms is a major cost reduction. The inlet guide structure itself has no moving parts and therefore requires relatively little maintenance except for replacing worn wiper bars.

It will be readily appreciated by those skilled in the art that modifications may be made to the invention without departing from the concepts disclosed in the foregoing description. Such modifications are to be considered as included within the following claims unless the claims, by their language, expressly state otherwise. Accordingly, the particular embodiments described in detail herein are illustrative only and are not limiting to the scope of the invention, which is to be given the fill breadth of the appended claims and any and all equivalents thereof.

I claim:

1. A belt press, comprising:
   a frame;
   a first belt movably mounted on the frame;
   a second belt movably mounted on the frame; and
   an adjustable fixed curvature profile inlet guide carried on the frame, the inlet guide having a first end and a second end, said fixed curvature profile having a decreasing radius from the first end to the second end, wherein said inlet guide is capable of being adjusted by moving said first end of said inlet guide to vary an angle between said first and second belts without changing the fixed curvature profile of the inlet guide.

2. The belt press as claimed in claim 1, wherein the second end of the inlet guide is pivotally mounted on the frame.

3. The belt press as claimed in claim 2, further including a positioning assembly attached to the inlet guide such that movement of the positioning assembly moves the first end of the inlet guide and pivots the second end of the inlet guide around a single pivot point.

4. The belt press as claimed in claim 2, wherein the second end of the inlet guide is pivotally mounted on the frame adjacent an inlet roller.

5. The belt press as claimed in claim 1, wherein the inlet guide is attached to the frame at a single pivot point.

6. The belt press as claimed in claim 1, further including a positioning assembly attached to the inlet guide such that movement of the positioning assembly moves the first end of the inlet guide.

7. The belt press as claimed in claim 6, wherein the positioning assembly includes a piston/cylinder assembly.

8. The belt press as claimed in claim 1, wherein the inlet guide is formed by a series of substantially parallel, spaced-apart wiper bars arranged in a holder.

* * * * *

UNITED STATES PATENT AND TRADEMARK OFFICE
CERTIFICATE OF CORRECTION

PATENT NO. : 6,454,102 B2
DATED : September 24, 2002
INVENTOR(S) : James E. Thompson It is certified that error appears in the above-identified patent and that said Letters Patent is hereby corrected as shown below:

Column 1,
Lines 12-14, delete "This application is a continuation-in-part of U.S. application Ser. No. 09/087,529, filed May 29, 1998, herein incorporated by reference."

Column 4,
Line 21, "nd sprocket" should read -- and sprocket --.
Line 23, "ositioning device" should read -- positioning device --.
Line 43, "or slunies" should read -- or slurries --.

Signed and Sealed this

Eleventh Day of March, 2003

JAMES E. ROGAN
*Director of the United States Patent and Trademark Office*